United States Patent
Fukaumi et al.

(10) Patent No.: US 12,319,815 B2
(45) Date of Patent: Jun. 3, 2025

(54) RESIN COMPOSITION, METHOD FOR PRODUCING SAME, AND MULTI-LIQUID CURABLE RESIN COMPOSITION

(71) Applicant: KANEKA CORPORATION, Osaka (JP)

(72) Inventors: Hiroki Fukaumi, Takasago (JP); Youichi Matsuo, Takasago (JP); Shinji Kagitani, Takasago (JP)

(73) Assignee: KANEKA CORPORATION, Osaka (JP)

( * ) Notice: Subject to any disclaimer, the term of this patent is extended or adjusted under 35 U.S.C. 154(b) by 755 days.

(21) Appl. No.: 17/526,166

(22) Filed: Nov. 15, 2021

(65) Prior Publication Data

US 2022/0073747 A1    Mar. 10, 2022

Related U.S. Application Data

(63) Continuation of application No. PCT/JP2020/019631, filed on May 18, 2020.

(30) Foreign Application Priority Data

May 22, 2019    (JP) .................. 2019-096036

(51) Int. Cl.
| | | |
|---|---|---|
| *C08L 83/04* | (2006.01) | |
| *C08G 77/08* | (2006.01) | |
| *C08G 77/18* | (2006.01) | |
| *C08K 5/06* | (2006.01) | |
| *C08K 5/56* | (2006.01) | |

(52) U.S. Cl.
CPC .............. *C08L 83/04* (2013.01); *C08G 77/08* (2013.01); *C08G 77/18* (2013.01); *C08K 5/06* (2013.01); *C08K 5/56* (2013.01)

(58) Field of Classification Search
CPC ..................................................... C08G 77/08
See application file for complete search history.

(56) References Cited

U.S. PATENT DOCUMENTS

| | | | | |
|---|---|---|---|---|
| 4,298,655 A | * | 11/1981 | Kray ..................... | C09D 183/04 |
| | | | | 428/447 |
| 2008/0241372 A1 | * | 10/2008 | Tahara ................... | G02B 30/27 |
| | | | | 524/394 |
| 2017/0204226 A1 | * | 7/2017 | Fukaumi ................ | C08G 77/08 |
| 2017/0283649 A1 | * | 10/2017 | Fukaumi ................. | C08K 3/36 |

FOREIGN PATENT DOCUMENTS

| | | |
|---|---|---|
| JP | H01-306477 A | 12/1989 |
| JP | H10-120972 A | 5/1998 |
| JP | 2000-303023 A | 10/2000 |
| JP | 2017-008143 A | 1/2017 |
| WO | 2016/098596 A1 | 6/2016 |

OTHER PUBLICATIONS

International Search Report issued in corresponding International Application No. PCT/JP2020/019631 dated Jul. 28, 2020 (5 pages).
Written Opinion issued in corresponding International Application No. PCT/JP2020/019631 dated Jul. 28, 2020 (3 pages).

\* cited by examiner

*Primary Examiner* — Margaret G Moore
(74) *Attorney, Agent, or Firm* — Osha Bergman Watanabe & Burton LLP

(57) ABSTRACT

A resin composition including (A) a glycidyloxy group-containing organopolysiloxane in an amount of 100 parts by weight, (B) a neutral salt in an amount of 0.001 parts by weight or more and 1 part by weight or less, (C) a β-dicarbonyl compound in an amount of 0.5 parts by weight or more and 10 parts by weight or less, and (D) a solvent in an amount of 20 parts by weight or more and 300 parts by weight or less is provided. In a multi-liquid curable resin composition including a first liquid and a second liquid, the first liquid is the resin composition, and the second liquid contains (E) an organoaluminum compound and/or organotitanium compound.

20 Claims, No Drawings

RESIN COMPOSITION, METHOD FOR PRODUCING SAME, AND MULTI-LIQUID CURABLE RESIN COMPOSITION

TECHNICAL FIELD

One or more embodiments of the present invention relate to a resin composition containing an organopolysiloxane, a method for producing the resin composition, and a multi-liquid curable resin composition containing the resin composition.

BACKGROUND

In recent years, studies have been conducted on imparting scratch resistance and water resistance to a base material such as an automobile interior base material by applying a curable composition containing an organopolysiloxane as a main component to a surface of the base material and curing the composition to form a hard coat layer.

The organopolysiloxane has been heretofore produced by subjecting an organo group-containing alkoxysilane to hydrolysis and dehydration condensation in the presence of an acid catalyst or a base catalyst. However, when the alkoxysilane has an epoxy group as a thermosetting functional group, the epoxy group is deactivated by an acid catalyst or a base catalyst, or gelled during hydrolysis and dehydration condensation.

Use of a neutral salt instead of an acid catalyst or a base catalyst as a condensation catalyst has been reported. Patent Literature 1 discloses a curable composition containing an organopolysiloxane obtained by subjecting an alkoxysilane compound, which has an epoxy group, to hydrolysis and dehydration condensation in the presence of a neutral salt catalyst, and a curing agent (e.g. an amine curing agent) which cures the epoxy group. With this, a cured product excellent in adhesion to a base material, abrasion resistance and alkali resistance is formed. The curable composition in this literature is described as a composition which is cured by heating or a composition which is cured by UV irradiation.

A composition which is cured by UV irradiation tends to cause an increase in cost because UV irradiation equipment is required for curing, and when the composition is to be cured by UV irradiation after being applied to a surface of a base material having a complicated shape, the composition may be unexposed, resulting in occurrence of curing failure. From the above viewpoint, a composition that is cured by heating is often more desirable than a composition that is cured by UV irradiation.

PATENT LITERATURE

PTL 1: WO 2016/098596 A1

SUMMARY

The present inventors have conducted studies, and resultantly found that a cured product formed from a curable composition containing an epoxy group-containing organopolysiloxane as disclosed in Patent Literature 1 has good adhesion to a base material, but does not have sufficient scratch resistance, and thus needs improvement in this respect.

In view of the above-described circumstances, one or more embodiments of the present invention provide a resin composition containing an epoxy group-containing organopolysiloxane. The resin composition is cured when heated after being mixed with a curing agent, and can form a cured product having excellent scratch resistance and good adhesion to a base material. One or more embodiments of the present invention provide a method for producing the resin composition. One or more embodiments of the present invention provide a multi-liquid curable resin composition containing the resin composition and a curing agent.

The present inventors have extensively conducted studies and resultantly found that the above can be achieved by a resin composition containing an organopolysiloxane having a glycidyloxy group as an epoxy group, a neutral salt, a β-dicarbonyl compound and a solvent, leading to one or more embodiments of the present invention.

That is, one or more embodiments of the present invention relate to a resin composition including (A) a glycidyloxy group-containing organopolysiloxane in an amount of 100 parts by weight, (B) a neutral salt in an amount of 0.001 parts by weight or more and 1 part by weight or less, (C) a β-dicarbonyl compound in an amount of 0.5 parts by weight or more and 10 parts by weight or less, and (D) a solvent in an amount of 20 parts by weight or more and 300 parts by weight or less.

The organopolysiloxane (A) may further have an epoxycyclohexyl group.

The organopolysiloxane (A) may satisfy a requirement that $[T3/(Q1+Q2+Q3+Q4+T1+T2+T3+D1+D2+M1)] \times 100$ be 50% or more and 75% or less (where among constituent units forming the organopolysiloxane (A), constituent units derived from a tetraalkoxysilane, which form one, two, three and four siloxane bonds, are defined as Q1, Q2, Q3 and Q4, respectively; constituent units derived from a monoorganotrialkoxysilane, which form one, two and three siloxane bonds, are defined as T1, T2 and T3, respectively; constituent units derived from a diorganodialkoxysilane, which form one and two siloxane bonds, are defined as D1 and D2, respectively; and constituent unit derived from a triorganomonoalkoxysilane, which form one siloxane bond, is defined as M1).

Preferably, the resin composition does not contain either an acidic compound having a molecular weight of 1000 or less or a basic compound having a molecular weight of 1000 or less.

One or more embodiments of the present invention also relate to a method for producing the resin composition, the method including the steps of:

subjecting an alkoxysilane component containing an alkoxysilane compound having a glycidyloxy group to a hydrolysis and dehydration condensation reaction in presence of the neutral salt (B) and water to obtain the organopolysiloxane (A) having a glycidyloxy group; and mixing the organopolysiloxane (A) with the β-dicarbonyl compound (C) and the solvent (D).

A ratio of the alkoxysilane compound having a glycidyloxy group to a total of the alkoxysilane component may be 50 mol % or more and 100 mol % or less.

A monoorganotrialkoxysilane may constitute 70 mol % or more and 100 mol % or less of a total of the alkoxysilane component.

An amount of the neutral salt (B) added may be 10 ppm or more and 10000 ppm or less based on a total weight of the alkoxysilane component.

An amount of water added may be 30 mol % or more and 80 mol % or less based on a total number of moles of alkoxy groups contained in the alkoxysilane component and directly bonded to silicon atoms.

The alkoxysilane component may further contain an alkoxysilane compound having an epoxycyclohexyl group.

One or more embodiments of the present invention also relate to a multi-liquid curable resin composition including a first liquid, and a second liquid, the first liquid being the above resin composition, the second liquid containing (E) an organoaluminum compound and/or organotitanium compound.

One or more embodiments of the present invention also relate to a cured product obtained by mixing the above resin composition with the (E) organoaluminum compound and/or organotitanium compound, and curing the mixture.

One or more embodiments of the present invention also relate to a method for producing a laminate containing a base material and a cured coating film, the method including the steps of: mixing the resin composition with the (E) organoaluminum compound and/or organotitanium compound to obtain a mixture; and applying the mixture to the base material, and heating and curing the mixture to form a cured coating film.

According to one or more embodiments of the present invention, it is possible to provide a resin composition including an epoxy group-containing organopolysiloxane. The resin composition is cured when heated after being mixed with a curing agent, and can form a cured product having excellent scratch resistance and good adhesion to a base material. It is also possible to provide a method for producing the resin composition, and a multi-liquid curable resin composition containing the resin composition and a curing agent.

DETAILED DESCRIPTION

Hereinafter, embodiments of the present invention will be described in detail, but one or more embodiments of the present invention are not limited to these embodiments.

The resin composition of the present embodiment contains at least an organopolysiloxane having a glycidyloxy group (A), a neutral salt (B), a β-dicarbonyl compound (C) and a solvent (D).

(Organopolysiloxane Having Glycidyloxy Group (A))

The organopolysiloxane having a glycidyloxy group (A) is an organopolysiloxane formed by subjecting an alkoxysilane component containing an alkoxysilane compound having a glycidyloxy group to a hydrolysis and dehydration condensation reaction in the presence of water. The organopolysiloxane (A) in the present embodiment does not refer to a composite resin obtained by combining an organopolysiloxane and acrylic silicon as disclosed in, for example, WO 2017/169459 A1, but refers to an organopolysiloxane which is not bonded to an organic resin.

The alkoxysilane component that is a precursor of the component (A) includes one or more silane compounds having an alkoxy group as a substituent on a silicon atom (hereinafter, also referred to as an alkoxysilane compound). Specific examples of the alkoxysilane compound include tetraalkoxysilane, monoorganotrialkoxysilane, diorganodialkoxysilane and triorganomonoalkoxysilane. The alkoxysilane component may have at least a monoorganotrialkoxysilane. The alkoxysilane component may include only a monoorganotrialkoxysilane, or only a monoorganotrialkoxysilane and a diorganodialkoxysilane. The monoorganotrialkoxysilane refers to a silane compound having one organic group and three alkoxy groups as substituents on a silicon atom, and the diorganodialkoxysilane refers to a silane compound having two organic groups and two alkoxy groups as substituents on a silicon atom.

According to one or more embodiments, the alkoxysilane component contains a monoorganotrialkoxysilane at 70 mol % or more and 100 mol % or less and a diorganodialkoxysilane at 30 mol % or less and 0 mol % or more. It is to be noted that the total amount of the monoorganotrialkoxysilane and the diorganodialkoxysilane is 100 mol %. The ratio of the monoorganotrialkoxysilane may be 80 mol % or more, 90 mol % or more, 95 mol % or more, 99 mol % or more, or 100 mol %.

The alkoxysilane component may contain a triorganomonoalkoxysilane and/or a tetraalkoxysilane in addition to the monoorganotrialkoxysilane or in addition to the monoorganotrialkoxysilane and the diorganodialkoxysilane. When the triorganomonoalkoxysilane and/or tetraalkoxysilane are used, the use amount thereof may be determined within the bounds of not inhibiting the effect of the invention, and for example, the ratio thereof to the total of the alkoxysilane component may be 10 mol % or less, 5 mol % or less, or 1 mol % or less.

The organic group present as a substituent on a silicon atom in the alkoxysilane compound is an organic group other than an alkoxy group. Specific examples include, but are not particularly limited to, alkyl groups having 1 or more and 8 or less carbon atoms, alkenyl groups having 2 or more and 8 or less carbon atoms, and aryl groups having 6 or more and 12 or less carbon atoms. The alkyl group, the alkenyl group and the aryl group may be an unsubstituted group, or may have a substituent. The number of carbon atoms in the alkyl group may be 1 or more and 6 or less, 1 or more and 4 or less, 1 or more and 3 or less, or 1 or more and 2 or less. The number of carbon atoms in the alkenyl group may be 2 or more and 6 or less, 2 or more and 4 or less, or 2 or more and 3 or less. Only one of the organic groups, or two or more thereof may be present.

Examples of the alkoxy group present as a substituent on a silicon atom in the alkoxysilane compound include alkoxy groups having 1 or more and 3 or less carbon atoms. Specific examples thereof include a methoxy group, an ethoxy group and a propoxy group, and a methoxy group and an ethoxy group are preferable, with a methoxy group being more preferable. Only one of the alkoxy groups, or two or more thereof may be present.

The alkoxysilane component contains at least an alkoxysilane compound having a glycidyloxy group. By using the compound, a glycidyloxy group can be introduced into the organopolysiloxane (A). By the glycidyloxy group, the crosslinking density of a cured product obtained by curing the curable composition can be enhanced to improve scratch resistance. The alkoxysilane compound having a glycidyloxy group may be any of a monoorganotrialkoxysilane, a diorganodialkoxysilane and a triorganomonoalkoxysilane, with a monoorganotrialkoxysilane being preferable.

Examples of the alkoxysilane compound having a glycidyloxy group include trialkoxysilane compounds having a glycidyloxyalkyl group, and dialkoxysilane compounds having a glycidyloxyalkyl group and the organic group. Specific examples thereof include 1-glycidyloxymethyl trimethoxysilane, 1-glycidyloxymethylmethyl dimethoxysilane, 1-glycidyloxymethyl triethoxysilane, 1-glycidyloxymethyl diethoxysilane, 2-glycidyloxyethyl trimethoxysilane, 2-glycidyloxyethylmethyl dimethoxysilane, 2-glycidyloxyethyl triethoxysilane, 2-glycidyloxyethylmethyl diethoxysilane, 3-glycidyloxypropyl trimethoxysilane, 3-glycidyloxypropylmethyl dimethoxysilane, 3-glycidyloxypropyl triethoxysilane, 3-glycidyloxypropylmethyl diethoxysilane, 4-glycidyloxybutyl trimethoxysilane, 4-dimethoxysilane, glycidyloxybutylmethyl 4-glycidyloxybutyl triethoxysilane, 4-diethoxysilane, 6-glycidyloxyhexyl glycidyloxybutylmethyl trimethoxysilane, 6-dimethoxysilane, glycidyloxyhexylmethyl 6-glycidyloxyhexyl triethoxysilane, 6-glycidyloxyhexylmethyl trimethoxysilane, diethoxysilane, 8-glycidyloxyoctyl glycidyloxyoctylmethyl dimethoxysilane, 8-glycidyloxyoctyl triethoxysilane and glycidyloxyoctylmethyl diethoxysilane. Among them, a trialkoxysilane compound or a dialkoxysilane compound having a 3-glycidyloxypropyl group is preferable, and a trialkoxysilane compound having a 3-glycidyloxypropyl group is particularly preferable.

The alkoxysilane component may include only one or more alkoxysilane compounds having a glycidyloxy group, or may include one or more alkoxysilane compounds having a glycidyloxy group and one or more alkoxysilane compounds having no glycidyloxy group.

The ratio of the alkoxysilane compound having a glycidyloxy group to the total of the alkoxysilane component may be 50 mol % or more and 100 mol % or less. When the alkoxysilane compound having a glycidyloxy group is used at such a ratio, the density of glycidyloxy groups serving as crosslinking points increases, so that the crosslinking density of the resulting cured product can be enhanced to improve scratch resistance. The ratio may be 60 mol % or more, 70 mol % or more, or 100 mol %.

Alkoxysilane compounds having no glycidyloxy group are classified into alkoxysilane compounds having an epoxycyclohexyl group, other epoxy group-containing silane compounds, and alkoxysilane compounds having no epoxy group. These are optional components, and may be omitted.

According to one or more embodiments, the alkoxysilane component further contains the alkoxysilane compound having an epoxycyclohexyl group, i.e., contains both an alkoxysilane compound having a glycidyloxy group and an alkoxysilane compound having an epoxycyclohexyl group. This enables introduction of both a glycidyloxy group and an epoxycyclohexyl group into the organopolysiloxane (A). Since an epoxycyclohexyl group is also present, the cured product has excellent scratch resistance, and the adhesion of the cured product to the base material and the water resistance of the cured product can be improved. However, even introduction of an epoxycyclohexyl group cannot achieve excellent scratch resistance if a glycidyloxy group is not introduced.

The alkoxysilane compound having an epoxycyclohexyl group may be any of a monoorganotrialkoxysilane, a diorganodialkoxysilane and a triorganomonoalkoxysilane, or a monoorganotrialkoxysilane.

Examples of the alkoxysilane compound having an epoxycyclohexyl group include trialkoxysilanes having an epoxycyclohexylalkyl group, and dialkoxysilanes having an epoxycyclohexylalkyl group and the organic group. Specific examples thereof include 1-(3,4-epoxycyclohexyl)methyltrimethoxysilane, 1-(3,4-epoxycyclohexyl)methylmethyldimethoxysilane, 1-(3,4-epoxycyclohexyl)methyltriethoxysilane, 1-(3,4-epoxycyclohexyl)methylmethyldiethoxysilane, 2-(3,4-epoxycyclohexyl)ethyltrimethoxysilane, 2-(3,4-epoxycyclohexyl)ethylmethyldimethoxysilane, 2-(3,4-epoxycyclohexyl)ethyltriethoxysilane, 2-(3,4-epoxycyclohexyl)ethylmethyldiethoxysilane, 3-(3,4-epoxycyclohexyl)propyltrimethoxysilane, 3-(3,4-epoxycyclohexyl) propylmethyldimethoxysilane, 3-(3,4-epoxycyclohexyl) propyltriethoxysilane, 3-(3,4-epoxycyclohexyl) propylmethyldiethoxysilane, 4-(3,4-epoxycyclohexyl) butyltrimethoxysilane, 4-(3,4-epoxycyclohexyl) butylmethyldimethoxysilane, 4-(3,4-epoxycyclohexyl) butyltriethoxysilane,4-(3,4-epoxycyclohexyl) butylmethyldiethoxysilane, 6-(3,4-epoxycyclohexyl) hexyltrimethoxysilane, 6-(3,4-epoxycyclohexyl) hexylmethyldimethoxysilane, 6-(3,4-epoxycyclohexyl) hexyltriethoxysilane,6-(3,4-epoxycyclohexyl) hexylmethyldiethoxysilane, 8-(3,4-epoxycyclohexyl) octyltrimethoxysilane, 8-(3,4-epoxycyclohexyl) octylmethyldimethoxysilane, 8-(3,4-epoxycyclohexyl) octyltriethoxysilane, and 8-(3,4-epoxycyclohexyl) octylmethyldiethoxysilane. Among them, a trialkoxysilane compound or a dialkoxysilane compound having a 2-(3,4-epoxycyclohexyl)ethyl group is preferable, and a trialkoxysilane compound having a 2-(3,4-epoxycyclohexyl)ethyl group is particularly preferable.

In one or more embodiments in which an alkoxysilane compound having a glycidyloxy group and an alkoxysilane compound having an epoxycyclohexyl group are used in combination, the use of both compounds may be such that the amount of epoxycyclohexyl groups is 0.1 moles or more and 1.0 mole or less based on 1 mole of glycidyloxy groups. When the alkoxysilane compound having an epoxycyclohexyl group is used at such a ratio, it is possible to improve the adhesion of the cured product to the base material and the water resistance of the cured product while maintaining excellent scratch resistance of the cured product. The ratio may be such that the amount of epoxycyclohexyl groups is 0.1 moles or more and 0.6 mol or less based on 1 mole of glycidyloxy groups.

Examples of the other epoxy group-containing silane compound include epoxy trimethoxysilane, epoxymethyl dimethoxysilane, epoxy triethoxysilane, epoxymethyl diethoxysilane, 1-epoxymethyl trimethoxysilane, 1-epoxymethylmethyl dimethoxysilane, 1-epoxymethyl triethoxysilane, 1-epoxymethylmethyl diethoxysilane, 2-epoxyethyl trimethoxysilane, 2-epoxyethylmethyl dimethoxysilane, 2-epoxyethyl triethoxysilane, 2-epoxyethylmethyl diethoxysilane, 3-epoxypropyl trimethoxysilane, 3-epoxypropylmethyl dimethoxysilane, 3-epoxypropyl triethoxysilane, 3-epoxypropylmethyl diethoxysilane, 4-epoxybutyl trimethoxysilane, 4-epoxybutylmethyl dimethoxysilane, 4-epoxybutyl triethoxysilane, 4-epoxybutylmethyl diethoxysilane, 6-epoxyhexyl trimethoxysilane, 6-epoxyhexylmethyl dimethoxysilane, 6-epoxyhexyl triethoxysilane, 6-epoxyhexylmethyl diethoxysilane, 8-epoxyoctyl trimethoxysilane, 8-epoxyoctylmethyl dimethoxysilane, 8-epoxyoctyl triethoxysilane and 8-epoxyoctylmethyl diethoxysilane.

The alkoxysilane compound having no epoxy group is not particularly limited. Examples of the alkoxysilane compound having no epoxy group when the organic group present as a substituent on a silicon atom in the alkoxysilane compound is an unsubstituted alkyl group include methyl trimethoxysilane, dimethyl dimethoxysilane, methyl triethoxysilane, dimethyl diethoxysilane, ethyl trimethoxysilane, ethylmethyl dimethoxysilane, ethyl triethoxysilane, ethylmethyl diethoxysilane, propyl trimethoxysilane, propylmethyl dimethoxysilane, propyl triethoxysilane, propylmethyl diethoxysilane, butyl trimethoxysilane, butylmethyl dimethoxysilane, butyl triethoxysilane, butyl triethoxysilane, butylmethyl diethoxysilane, hexyl trimethoxysilane, hexylmethyl dimethoxysilane, hexylmethyl dimethoxysilane, hexyl triethoxysilane, hexylmethyl diethoxysilane, octyl trimethoxysilane, octylmethyl dimethoxysilane, octyl triethoxysilane, and octylmethyl diethoxysilane.

When the organic group present as a substituent on a silicon atom in the alkoxysilane compound is an organic group having a substituent, the substituent is not particularly limited, and is preferably a thiol group, an isocyanate group, a (meth)acryloyl group, a phenyl group, a cyclohexyl group or a chloro group from the viewpoint of availability.

Examples of the alkoxysilane compound having no epoxy group when the organic group is an alkyl group having a thiol group include 1-mercaptomethyl trimethoxysilane, 1-mercaptomethylmethyl dimethoxysilane, 1-mercaptomethyl triethoxysilane, 1-mercaptomethylmethyl diethoxysilane, 2-mercaptoethyl trimethoxysilane, 2-mercaptoethylmethyl dimethoxysilane, 2-mercaptoethyl triethoxysilane, 2-mercaptoethylmethyl diethoxysilane, 3-mercaptopropyl trimethoxysilane, 3-mercaptopropylmethyl dimethoxysilane, 3-mercaptopropyl triethoxysilane, 3-mercaptopropylmethyl diethoxysilane, 4-mercaptobutyl trimethoxysilane, 4-mercaptobutylmethyl dimethoxysilane, 4-mercaptobutyl triethoxysilane, 4-mercaptobutylmethyl diethoxysilane, 6-mercaptohexyl trimethoxysilane, 6-mercaptohexylmethyl dimethoxysilane, 6-mercaptohexyl triethoxysilane, 6-mercaptohexylmethyl diethoxysilane, 8-mercaptooctyl trimethoxysilane, 8-mercaptooctylmethyl dimethoxysilane, 8-mercaptooctyl triethoxysilane and 8-mercaptooctylmethyl diethoxysilane.

Examples of the alkoxysilane compound having no epoxy group when the organic group is an alkyl group having an isocyanate group include 1-isocyanatemethyl trimethoxysilane, 1-isocyanatemethylmethyl dimethoxysilane, 1-isocyanatemethyl triethoxysilane, 1-isocyanatemethylmethyl diethoxysilane, 2-isocyanateethyl trimethoxysilane, 2-isocyanateethylmethyl dimethoxysilane, 2-isocyanateethyl triethoxysilane, 2-isocyanateethylmethyl diethoxysilane, 3-isocyanatepropyl trimethoxysilane, 3-isocyanatepropylmethyl dimethoxysilane, 3-isocyanatepropyl triethoxysilane, 3-isocyanatepropylmethyl diethoxysilane, 4-isocyanatebutyl trimethoxysilane, 4-isocyanatebutylmethyl dimethoxysilane, 4-isocyanatebutyl triethoxysilane, 4-isocyanatebutylmethyl diethoxysilane, 6-isocyanatehexyl trimethoxysilane, 6-isocyanatehexylmethyl dimethoxysilane, 6-isocyanatehexyl triethoxysilane, 6-isocyanatehexylmethyl diethoxysilane, 8-isocyanateoctyl trimethoxysilane, 8-isocyanateoctylmethyl dimethoxysilane, 8-isocyanateoctyl triethoxysilane and 8-isocyanateoctylmethyl diethoxysilane.

Examples of the alkoxysilane compound having no epoxy group when the organic group is an alkyl group having a (meth)acryloyl group include 1-(meth)acryloyloxymethyl trimethoxysilane, 1-(meth)acryloyloxymethylmethyl dimethoxysilane, 1-(meth)acryloyloxymethyl triethoxysilane, 1-(meth)acryloyloxymethyl diethoxysilane, 2-(meth)acryloyloxyethyl trimethoxysilane, 2-(meth)acryloyloxyethylmethyl dimethoxysilane, 2-(meth)acryloyloxyethyl triethoxysilane, 2-(meth)acryloyloxyethylmethyl diethoxysilane, 3-(meth)acryloyloxypropyl trimethoxysilane, 3-(meth)acryloyloxypropylmethyl dimethoxysilane, 3-(meth)acryloyloxypropyl triethoxysilane, 3-(meth)acryloyloxypropylmethyl diethoxysilane, 4-(meth)acryloyloxybutyl trimethoxysilane, 4-(meth)acryloyloxybutylmethyl dimethoxysilane, 4-(meth)acryloyloxybutyl triethoxysilane, 4-(meth)acryloyloxybutylmethyl diethoxysilane, 6-(meth)acryloyloxyhexyl trimethoxysilane, 6-(meth)acryloyloxyhexylmethyl dimethoxysilane, 6-(meth)acryloyloxyhexyl triethoxysilane, 6-(meth)acryloyloxyhexylmethyl diethoxysilane, 8-(meth)acryloyloxyoctyl trimethoxysilane, 8-(meth)acryloyloxyoctylmethyl dimethoxysilane, 8-(meth)acryloyloxyoctyl triethoxysilane and 8-(meth)acryloyloxyoctylmethyl diethoxysilane.

Examples of the alkoxysilane compound having no epoxy group when the organic group is an alkyl group having a phenyl group include benzyl trimethoxysilane, benzyl triethoxysilane, 2-phenylethyl trimethoxysilane, 2-phenylethyl triethoxysilane, 3-phenylpropyl trimethoxysilane, 3-phenylpropyl triethoxysilane, 4-phenylbutyl trimethoxysilane, 4-phenylbutyl triethoxysilane, 5-phenylpentyl trimethoxysilane, 5-phenylpentyl triethoxysilane, 6-phenylhexyl trimethoxysilane, and 6-phenylhexyl triethoxysilane.

Examples of the alkoxysilane compound having no epoxy group when the organic group is an alkyl group having a cyclohexyl group include cyclohexyl trimethoxysilane, cyclohexyl triethoxysilane, 2-cyclohexylethyl trimethoxysilane, 2-cyclohexylethyl triethoxysilane, 3-cyclohexylpropyl trimethoxysilane, 3-cyclohexylpropyl triethoxysilane, 4-cyclohexylbutyl trimethoxysilane, 4-cyclohexylbutyl triethoxysilane, 5-cyclohexylpentyl trimethoxysilane, 5-cyclohexylpentyl triethoxysilane, 6-cyclohexylhexyl trimethoxysilane, and 6-cyclohexylhexyl triethoxysilane.

Examples of the alkoxysilane compound having no epoxy group when the organic group is an alkyl group having a chloro group include chloromethyl trimethoxysilane, chloromethyl triethoxysilane, 2-chloroethyl trimethoxysilane, 2-chloroethyl triethoxysilane, 3-chloropropyl trimethoxysilane, 3-chloropropyl triethoxysilane, 4-chlorobutyl trimethoxysilane, 4-chlorobutyl triethoxysilane, 5-chloropentyl trimethoxysilane, 5-chloropentyl triethoxysilane, 6-chlorohexyl trimethoxysilane, and 6-chlorohexyl triethoxysilane.

Examples of the alkoxysilane compound having no epoxy group when the organic group is an alkenyl group include vinyl trimethoxysilane, vinylmethyl dimethoxysilane, vinyl triethoxysilane, vinylmethyl diethoxysilane, allyl trimethoxysilane, allylmethyl dimethoxysilane, allyl triethoxysilane, and allylmethyl diethoxysilane.

Examples of the alkoxysilane compound having no epoxy group when the organic group is an aryl group include phenyl trimethoxysilane, phenylmethyl dimethoxysilane, phenyl triethoxysilane, phenylmethyl diethoxysilane, diphenyl dimethoxysilane, diphenyl diethoxysilane, p-styryl trimethoxysilane, and p-styryl triethoxysilane.

The organopolysiloxane (A) having a glycidyloxy group may have a reactive silicon group in addition to a glycidyloxy group. Here, the reactive silicon group conceptually includes both an alkoxysilyl group and a silanol group. The reactive silicon group that can be present in the organopolysiloxane (A) is such that some of alkoxy groups contained in the alkoxysilane component remain unreacted, or the alkoxy groups remain as silanol groups without processing of a dehydration condensation reaction after undergoing a hydrolysis reaction.

The organopolysiloxane (A) may be one in which in all the constituent units (Q1, Q2, Q3, Q4, T1, T2, T3, D1, D2 and M1) forming the organopolysiloxane (A), the ratio of the constituent unit T3 derived from a monoorganotrialkoxysilane and forming three siloxane bonds: $[T3/(Q1+Q2+Q3+Q4+T1+T2+T3+D1+D2+M1)] \times 100$ is relatively high. The ratio of T3 being a high value means that many alkoxy groups are converted into siloxane bonds, and there are many sites T3 having a silsesquioxane structure in the organopolysiloxane (A). The silsesquioxane structure is a structure which has both a dense crosslinked structure and flexibility, and contributes to development of scratch resistance and water resistance of a cured product. On the other hand, when the ratio of T3 is 0%, there is no silsesquioxane structure, and desired physical properties from the organopolysiloxane are hardly developed.

Here, among constituent units forming the organopolysiloxane (A), constituent units derived from tetraalkoxysilane, which form one, two, three and four siloxane bonds, are defined as Q1, Q2, Q3 and Q4, respectively;

constituent units derived from a monoorganotrialkoxysilane, which form one, two and three siloxane bonds, are defined as T1, T2 and T3, respectively;

constituent units derived from a diorganodialkoxysilane, which form one and two siloxane bonds, are defined as D1 and D2, respectively; and constituent unit derived from a triorganomonoalkoxysilane, which form one siloxane bond, is defined as M1.

On the basis of peak areas of peaks derived from Q1, Q2, Q3, Q4, T1, T2, T3, D1, D2 and M1, which are measured by $^{29}$Si-NMR, the ratio of T3 is calculated as a ratio (%) of an area of a peak derived from T3 to the total peak area.

In the present embodiment, it is preferable that an organopolysiloxane having a relatively high ratio of T3 is used as the component (A). Specifically, the organopolysiloxane having a relatively high ratio of T3 is one in which [T3/(Q1+Q2+Q3+Q4+T1+T2+T3+D1+D2+M1)]×100 may be 40% or more and 75% or less, 50% or more and 75% or less, 50% or more and 73% or less, or 60% or more and 71% or less. When the ratio of T3 is 40% or more, generation of cracks due to shrinkage by curing can be effectively suppressed. When the ratio of T3 is 75% or less, cationic polymerization of epoxy groups sufficiently proceeds during curing by heating, so that scratch resistance of a cured product obtained can be improved.

An organopolysiloxane produced using a neutral salt catalyst has a higher ratio of the total number of moles of T1 and T2 in comparison with an organopolysiloxane produced using a base catalyst, and a lower ratio of the total number of moles of T1 and T2 in comparison with an organopolysiloxane produced using an acid catalyst. The organopolysiloxane (A) produced using a neutral salt catalyst is one in which [(T1+T2)/(Q1+Q2+Q3+Q4+T1+T2+T3+D1+D2+M1)]×100 may be 25% or more and 60% or less, 25% or more and 50% or less, 27% or more and 50% or less, or 29% or more and 40% or less.

In the organopolysiloxane (A) produced using a neutral salt catalyst, the ratio of the number of moles of T1 can fall within a specific range in comparison with the organopolysiloxane produced using a base catalyst or an acid catalyst, and [T1/(Q1+Q2+Q3+Q4+T1+T2+T3+D1+D2+M1)]×100 may be 2% or more and 20% or less, 3% or more and 15% or less, or 4% or more and 12% or less, from the same viewpoint.

The ratio of T3 and the like can be controlled by adjusting the amount of water and the type and amount of a catalyst used in the hydrolysis and dehydration condensation reaction for forming the organopolysiloxane, the reaction temperature, the removal amount of alcohol generated in the hydrolysis reaction, and the like.

The weight average molecular weight (MW) of the organopolysiloxane (A) is not particularly limited, and is preferably 500 or more and 30000 or less, more preferably 1000 or more and 20000 or less, and still more preferably 2500 or more and 10000 or less from the viewpoints of adhesion of the cured product to the base material, scratch resistance, water resistance, the appearance of the cured product, storage stability and the like. The weight average molecular weight of the organopolysiloxane can be determined by the method described in the section of examples.

(Method for Producing Organopolysiloxane (A))

Next, a method for producing the organopolysiloxane (A) having a glycidyloxy group will be described. The organopolysiloxane (A) can be obtained by subjecting an alkoxysilane component containing an alkoxysilane compound having a glycidyloxy group to a hydrolysis and dehydration condensation reaction in the presence of water. In the hydrolysis and dehydration condensation reaction, some of alkoxy groups contained in the alkoxysilane component may remain unreacted, or the alkoxy groups may remain as silanol groups without procession of a dehydration condensation reaction after undergoing a hydrolysis reaction. Here, the produced organopolysiloxane has an alkoxysilyl group and/or a silanol group in addition to a glycidyloxy group.

(Neutral Salt (B))

The hydrolysis and dehydration condensation reaction of the alkoxysilane component can be carried out in the presence of a base catalyst, an acid catalyst or a neutral salt as a condensation catalyst, and water, and in the present embodiment, it is preferable to carry out the hydrolysis and dehydration condensation reaction in the presence of a neutral salt (B) as a condensation catalyst and water. By carrying out the hydrolysis and dehydration condensation reaction in the presence of a neutral salt catalyst, the organopolysiloxane (A) having a glycidyloxy group can be obtained while deactivation of the glycidyloxy group is suppressed, and by blending the obtained organopolysiloxane (A) containing the neutral salt (B) with a component (C) as described later and curing the mixture in the presence of a component (E), a cured product having excellent scratch resistance and good adhesion to a base material can be formed. When the hydrolysis and dehydration condensation reaction is carried out in the presence of a neutral salt, it is preferable to carry out the reaction without any of a base catalyst and an acid catalyst.

When the organopolysiloxane is produced using a neutral salt catalyst, the organopolysiloxane has a higher ratio of T1 and/or T2 in the organopolysiloxane and a larger number of reactive silicon groups in the organopolysiloxane, in comparison with a case where the organopolysiloxane is produced using a base catalyst. It is considered that the reactive silicon group is involved in the crosslinking reaction to increase the crosslinking density of the cured product, leading to improvement of the scratch resistance of the cured product.

On the other hand, the organopolysiloxane produced using an acid catalyst has an excessively high ratio of T1 and/or T2 and an excessively large number of reactive silicon groups in the organopolysiloxane, resulting in significant deterioration of the adhesion of the cured product to the base material. In contrast, the organopolysiloxane produced using a neutral salt catalyst enables improvement of scratch resistance without deteriorating adhesion to the base material.

In the present application, the neutral salt as the component (B) refers to a normal salt formed by a strong acid and a strong base. Specifically, the neutral salt is a salt including a combination of any cation selected from the group consisting of group I element ions, group II element ions, a tetraalkylammonium ion and a guanidinium ion and any anion selected from the group consisting of a sulfate ion, a nitrate ion and a perchlorate ion, and group XVII element ions except for the fluoride ion.

Specific examples of the neutral salt (B) include the following compounds: lithium chloride, sodium chloride, potassium chloride, rubidium chloride, cesium chloride, francium chloride, beryllium chloride, magnesium chloride, calcium chloride, strontium chloride, barium chloride, radium chloride, tetramethylammonium chloride, tetraethylammonium chloride, tetrapropylammonium chloride, tetrabutylammonium chloride, tetrapentylammonium chloride, tetrahexylammonium chloride and guanidinium chloride;

lithium bromide, sodium bromide, potassium bromide, rubidium bromide, cesium bromide, francium bromide, beryllium bromide, magnesium bromide, calcium bromide, strontium bromide, barium bromide, radium bromide, tetramethylammonium bromide, tetraethylammonium bromide, tetrapropylammonium bromide, tetrabutylammonium bromide, tetrapentylammonium bromide, tetrahexylammonium bromide and guanidinium bromide;

lithium iodide, sodium iodide, potassium iodide, rubidium iodide, cesium iodide, francium iodide, beryllium iodide, magnesium iodide, calcium iodide, strontium iodide, barium iodide, radium iodide, tetramethylammonium iodide, tetraethylammonium iodide, tetrapropylammonium iodide, tetrabutylammonium iodide, tetrapentylammonium iodide, tetrahexylammonium iodide and guanidinium iodide;

lithium sulfate, sodium sulfate, potassium sulfate, rubidium sulfate, cesium sulfate, francium sulfate, beryllium sulfate, magnesium sulfate, calcium sulfate, strontium sulfate, barium sulfate, radium sulfate, tetramethylammonium sulfate, tetraethylammonium sulfate, tetrapropylammonium sulfate, tetrabutylammonium sulfate, tetrapentylammonium sulfate, tetrahexylammonium sulfate and guanidinium sulfate;

lithium nitrate, sodium nitrate, potassium nitrate, rubidium nitrate, cesium nitrate, francium nitrate, beryllium nitrate, magnesium nitrate, calcium nitrate, strontium nitrate, barium nitrate, radium nitrate, tetramethylammonium nitrate, tetraethylammonium nitrate, tetrapropylammonium nitrate, tetrabutylammonium nitrate, tetrapentylammonium nitrate, tetrahexylammonium nitrate and guanidinium nitrate; and lithium perchlorate, sodium perchlorate, potassium perchlorate, rubidium perchlorate, cesium perchlorate, francium perchlorate, beryllium perchlorate, magnesium perchlorate, calcium perchlorate, strontium perchlorate, barium perchlorate, radium perchlorate, tetramethylammonium perchlorate, tetraethylammonium perchlorate, tetrapropylammonium perchlorate, tetrabutylammonium perchlorate, tetrapentylammonium perchlorate, tetrahexylammonium perchlorate and guanidinium perchlorate. As the neutral salt, a single compound may be used, or two or more compounds may be used in combination.

The anion that forms the neutral salt (B) may be a group XVII element ion because it has high nucleophilicity. The cation may be one that is not so bulky that the nucleophilic action is inhibited, and specifically, group I element ions or group II element ions are preferable. Further, in view of availability and safety during handling, the neutral salt (B) may be lithium chloride, sodium chloride, potassium chloride, rubidium chloride, cesium chloride, magnesium chloride, calcium chloride, strontium chloride, lithium bromide, sodium bromide, potassium bromide, rubidium bromide, cesium bromide, magnesium bromide, calcium bromide, strontium bromide, lithium iodide, sodium iodide, potassium iodide, rubidium iodide, cesium iodide, magnesium iodide, calcium iodide or strontium iodide.

The amount of the neutral salt (B) added in the hydrolysis and dehydration condensation reaction can be appropriately determined according to a desired degree of procession of the hydrolysis and dehydration condensation reaction, and is typically 1 ppm or more and 100000 ppm or less, preferably 10 ppm or more and 10000 ppm or less, more preferably 20 ppm or more and 5000 ppm or less, still more preferably 50 ppm or more and 1000 ppm or less, based on the total weight of the alkoxysilane component.

In the hydrolysis and dehydration condensation reaction, the reaction is caused to proceed by adding water. Here, by controlling the amount of water used, the degree of procession of the hydrolysis and dehydration condensation reaction, and hence the ratio of T3 in the organopolysiloxane and the molecular weight of the organopolysiloxane can be controlled. From this viewpoint, the amount of water used may be 20 mol % or more and 100 mol % or less based on the total number of moles of alkoxy groups contained in the alkoxysilane component and directly bonded to silicon atoms. When the content is 20 mol % or more, the hydrolysis and dehydration condensation reaction sufficiently proceeds, and when the content is 100 mol % or less, the adhesion of the cured product to the base material and the water resistance can be further improved. The amount of water used may be 20 mol % or more and 90 mol % or less, 25 mol % or more and 80 mol % or less, 30 mol % or more and 80 mol % or less, or 30 mol % or more and 60 mol % or less.

In the hydrolysis and dehydration condensation reaction, an organic solvent other than water may be used in addition to water. The organic solvent may be an organic solvent having a high solubility in water because the organic solvent is used in combination with water. An organic solvent having 4 or more carbon atoms is preferable for securing solubility of the alkoxysilane component. From the above viewpoint, examples of the preferred organic solvent include, but are not limited to, propylene glycol methyl ether acetate, diethylene glycol monomethyl ether, triethylene glycol monomethyl ether, polyethylene glycol monomethyl ether, ethylene glycol monoethyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, propylene glycol monomethyl ether, propylene glycol dimethyl ether, dipropylene glycol monomethyl ether, tripropylene glycol monomethyl ether, propylene glycol monoethyl ether, propylene glycol monopropyl ether, ethylene glycol dimethyl ether, diethylene glycol dimethyl ether, triethylene glycol dimethyl ether, diethylene glycol methyl ethyl ether, diethylene glycol diethyl ether, ethylene glycol diethyl ether, tetrahydrofuran, acetone, methyl ethyl ketone, methyl acetate, ethyl acetate, methanol, ethanol, 1-propanol and 2-propanol.

When the hydrolysis and dehydration condensation reaction is carried out, the reaction temperature can be appropriately set by those skilled in the art, and for example, it is preferable to heat the reaction liquid to a range of 50° C. or higher and 110° C. or lower. When the hydrolysis and dehydration condensation reaction is carried out at a temperature of 110° C. or lower, the organopolysiloxane (A) is easily produced. When the hydrolysis and dehydration condensation reaction is carried out, the reaction time can be appropriately set by those skilled in the art, and may be, for example, about 10 minutes or more and 12 hours or less.

It is preferable to carry out a step of removing alcohol generated in the hydrolysis reaction from the reaction liquid after the hydrolysis and dehydration condensation reaction. Removal of alcohol enables further procession of the hydrolysis reaction of alkoxysilyl groups in which alcohol is generated as a by-product. The step of removing alcohol can be carried out by subjecting the reaction liquid after the hydrolysis and dehydration condensation reaction to distillation under reduced pressure to distill off the alcohol. Conditions for distillation under reduced pressure can be appropriately set by those skilled in the art, and the temperature at this time may be 50° C. or higher and 110° C. or lower for the same reason as described above. In this step, it is preferable to remove preferably 80 mol % or more, more preferably 90 mol % or more of the alcohol generated in the hydrolysis reaction.

After alcohol is removed as described above, the reaction system is cooled to, for example, 30° C. or lower to obtain the organopolysiloxane (A) having a glycidyloxy group.

When the neutral salt (B) is used as a condensation catalyst in production of the organopolysiloxane (A), the resulting organopolysiloxane (A) can contain the neutral salt (B). As a result, the resin composition of the present embodiment can also contain the neutral salt (B). The amount of the neutral salt (B) contained in the resin composition is typically 0.001 parts by weight or more and 1 part by weight or less, preferably 0.005 parts by weight or more and 0.1 parts by weight or less, more preferably 0.01 parts by weight or more and 0.05 parts by weight or less, based on 100 parts by weight of the organopolysiloxane (A).

When the organopolysiloxane (A) is produced using a neutral salt as a condensation catalyst, the resin composition of the present embodiment is typically free of a base catalyst and an acid catalyst. Thus, it is preferable that the resin composition of the present embodiment preferably does not contain either an acidic compound having a molecular weight of 1000 or less or a basic compound having a molecular weight of 1000 or less. Here, the acidic compound or basic compound having a molecular weight of 1000 or less includes an acid catalyst or a base catalyst which is generally used in a hydrolysis and dehydration condensation reaction of an alkoxysilane component.

(β-dicarbonyl Compound (C))

By blending the β-dicarbonyl compound (C) with the resin composition, the scratch resistance of the cured product can be improved. The β-dicarbonyl compound (C) is assumed to stabilize the organopolysiloxane (A), so that a reaction between a reactive silicon group that can be present in the component (A) and the organoaluminum compound and/or organotitanium compound (E) and a crosslinking reaction between epoxy groups proceed in parallel, resulting in improvement of the scratch resistance of the cured product.

The β-dicarbonyl compound refers to a compound having a structure in which two carbonyl groups are bonded to each other with one carbon atom sandwiched therebetween. The β-dicarbonyl compound is not particularly limited, and examples thereof include β-diketones, β-diesters and β-ketoesters, e.g., acetylacetone, dimethone, cyclohexane-1,3-dione, methyl acetoacetate, ethyl acetoacetate, dimethyl malonate, diethyl malonate and Meldrum's acid. From the viewpoint of cost and availability, acetylacetone, methyl acetoacetate or ethyl acetoacetate is preferable. Acetylacetone is preferable because it has a boiling point of about 140° C., and is thus easily volatilized during thermal curing. Methyl acetoacetate and ethyl acetoacetate have boiling points of about 170° C. and 180° C., respectively, and are less likely to volatilize than acetylacetone, but are preferable because they have a more remarkable pot life extending effect, and can exhibit a pot life extending effect even when used in a small amount.

The amount of the β-dicarbonyl compound (C) blended can be appropriately determined according to the physical properties of the cured product, and is preferably 0.5 parts by weight or more and 10 parts by weight or less based on 100 parts by weight of the organopolysiloxane (A). When the amount of the component (C) added is 0.5 parts by weight or more, a scratch resistance improving effect can be obtained. When the amount of the component (C) is 10 parts by weight or less, the scratch resistance of the cured product can be improved to suppress generation of cracks due to shrinkage by curing. The amount of the component (C) may be 0.7 parts by weight or more and 4 parts by weight or less, or 1 part by weight or more and 3 parts by weight or less.

(Solvent (D))

The solvent (D) is not particularly limited, and when the base material to which the multi-liquid curable resin composition is applied is made of plastic, ketones such as methyl isobutyl ketone and diisobutyl ketone, alcohols such as butanol and isopropyl alcohol, esters such as butyl acetate, isobutyl acetate and isopropyl acetate, and ethers such as diethylene glycol methyl ether, propylene glycol methyl ether and propylene glycol methyl ether acetate are preferable because the base material often has low solvent resistance. In particular, it is preferable to use an ether-based solvent in an amount of 30 wt % or more of all solvents from the viewpoint of preventing damage to the base material. The amount of the solvent blended can be appropriately set, and is preferably 20 parts by weight or more and 300 parts by weight or less, more preferably 30 parts by weight or more and 150 parts by weight or less, based on 100 parts by weight of the organopolysiloxane (A).

(Other Additives)

In production of the resin composition of the present embodiment, other additives may be appropriately blended in addition to the above-described components. Examples of such additives include inorganic fillers, inorganic pigments, organic pigments, plasticizers, dispersants, wetting agents, thickeners and antifoaming agents. The resin composition of the present embodiment optionally contains a reactive resin such as an acrylic resin or a vinyl resin having a hydrolyzable silyl group.

The inorganic filler is not particularly limited, and examples thereof include silica-based inorganic fillers such as quartz, fumed silica, precipitated silica, silicic anhydride, fused silica, crystalline silica and ultrafine powder amorphous silica, alumina, zircon, titanium oxide, zinc oxide, silicon nitride, boron nitride, aluminum nitride, silicon carbide, glass fiber, alumina fiber, carbon fiber, mica, black lead, carbon black, graphite, diatomaceous earth, white earth clay, talc, aluminum hydroxide, calcium carbonate, magnesium carbonate, barium sulfate, potassium titanate, calcium silicate, inorganic balloon and silver powder.

The inorganic filler may be subjected to surface treatment as appropriate. Examples of the surface treatment method include alkylation treatment, trimethylsilylation treatment, silicone treatment, and treatment with a coupling agent.

Examples of the coupling agent include silane coupling agents. The silane coupling agent is not particularly limited as long as it is a compound having at least one functional group reactive with an organic group and at least one hydrolyzable silicon group. The functional group reactive with an organic group may be at least one selected from an epoxy group, a methacrylic group, an acrylic group, an isocyanate group, an isocyanurate group, a vinyl group and a carbamate group from the viewpoint of handleability, or an epoxy group, a methacrylic group or an acrylic group from the viewpoint of curability and bondability. The hydrolyzable silicon group may be an alkoxysilyl group from the viewpoint of handleability, or a methoxysilyl group or an ethoxysilyl group from the viewpoint of reactivity.

Examples of the preferred silane coupling agent include alkoxysilanes having an epoxy group, such as 3-glycidoxypropyltrimethoxysilane, 3-glycidoxypropyltriethoxysilane, 2-(3,4-epoxycyclohexyl)ethyltrimethoxysilane, and 2-(3,4-epoxycyclohexyl)ethyltriethoxysilane.; and alkoxysilanes having a methacrylic group or an acrylic group, such as 3-methacryloxypropyltrimethoxysilane, 3-methacryloxypropyltriethoxysilane, 3-acryloxypropyltrimethoxysilane, 3-acryloxypropyltriethoxysilane, methacryloxymethyltriethoxysilane, methacryloxymethyltrimethoxysilane, acryloxymethyltrimethoxysilane and acryloxymethyltriethoxysilane.

The method for mixing the components is not particularly limited, and a known method can be appropriately used. Examples thereof include a method in which components are blended, and stirred using a hand mixer or a static mixer; a method in which components are kneaded at room temperature or under heating using a planetary mixer, a disper, a roll, a kneader or the like; and a method in which components are dissolved using a small amount of a suitable solvent, and the solution is stirred.

(Multi-Liquid Curable Resin Composition)

The multi-liquid curable composition of the present embodiment may have a two-liquid form including at least a first liquid and a second liquid. In the two-liquid form including a main agent and a curing agent, it is preferable that the main agent is the resin composition, i.e., a resin composition containing the organopolysiloxane (A) having a glycidyloxy group, the neutral salt (B), the β-dicarbonyl compound (C), and the solvent (D), and on the other hand, the curing agent includes an organoaluminum compound and/or organotitanium compound (E). However, the β-dicarbonyl compound (C) may be contained in the curing agent.

(Organoaluminum Compound and/or Organotitanium Compound (E))

By curing the resin composition in the presence of the organoaluminum compound and/or organotitanium compound (E), the scratch resistance of the cured product can be improved. The component (E) promotes a crosslinking reaction between epoxy groups and also promotes a condensation reaction between reactive silicon groups. In addition, it is assumed that the component (E) reacts with a reactive silicon group, which can be present in the organopolysiloxane, to form a Si—O—Al bond or a Si—O—Ti bond, so that a dense crosslinked structure is formed, resulting in improvement of the scratch resistance of the cured product. As the organoaluminum compound and/or organotitanium compound, only one compound may be used, or two or more compounds may be used in combination.

Examples of the organoaluminum compound include aluminum alkoxide compounds, aluminum acetoacetate compounds, aluminum ethylacetoacetate compounds and aluminum acetylacetonate compounds. More specific examples include aluminum triisopropoxide, aluminum tri-secondary butoxide, diisopropoxy mono-secondary butoxyaluminum, diisopropoxy ethyl acetoacetate aluminum, diisopropoxy acetylacetonate aluminum, isopropoxy bis(ethylacetoacetate) aluminum, isopropoxy bis(acetylacetonate) aluminum, tris(ethylacetoacetate) aluminum, tris(acetylacetonate) aluminum and monoacetylacetonate bis(ethylacetoacetate) aluminum.

Examples of the organotitanium compound include titanium alkoxide compounds, titanium acetoacetate compounds, titanium ethyl acetoacetate compounds and titanium acetylacetonate compounds. More specific examples thereof include diisopropoxy-bis(ethylacetoacetate) titanium, diisopropoxy-bis(acetylacetate) titanium, diisopropoxy-bis(acetylacetate) titanium, tetra-i-propoxytitanium, tetra-n-butoxytitanium, tetra-t-butoxytitanium and tetrakis(2-ethylhexyloxy) titanium.

The amount of the organoaluminum compound and/or organotitanium compound (E) added can be appropriately determined according to the physical properties of the cured product, and is preferably 0.5 parts by weight or more and 10 parts by weight or less based on 100 parts by weight of the organopolysiloxane (A). When the amount of the component (E) added is 0.5 parts by weight or more, a scratch resistance improving effect can be obtained. When the amount is 10 parts by weight or less, good adhesion to the base material is achieved, and it is also possible to suppress yellowing of the cured product. The amount may be 0.5 parts by weight or more and 5 parts by weight or less, or 2 parts by weight or more and 5 parts by weight or less.

(Cured Product)

The cured product of the present embodiment is one formed by mixing the resin composition with the organoaluminum compound and/or organotitanium compound (E), and curing the mixture. The cured product may be one formed by mixing a first liquid (main agent) and a second liquid (curing agent) forming the multi-liquid curable resin composition, and curing the obtained mixture by heating.

The heating temperature for curing the mixture is not particularly limited, and is typically 50° C. or higher and 200° C. or lower, preferably 60° C. or higher and 120° C. or lower, preferably 70° C. or higher and 110° C. or lower, more preferably 80° C. or higher and 100° C. or lower. The multi-liquid curable resin composition according to the present embodiment can form a cured product having excellent scratch resistance even when cured at a relatively low temperature of 60° C. or higher and 120° C. or lower.

The heating time for curing the mixture is not particularly limited, and is preferably 10 to 120 minutes, more preferably 15 to 100 minutes, still more preferably 30 to 60 minutes, from the viewpoint of securing both low cost and the degree of procession of the curing reaction.

(Application)

The multi-liquid curable resin composition or cured product of the present embodiment can be used for various applications. The multi-liquid curable resin composition or cured product can be applied, to for example, transparent materials, optical materials, optical lenses, optical films, optical sheets, adhesives for optical components, optical adhesives for bonding optical waveguides, adhesives for fixing optical waveguide peripheral members, adhesives for bonding DVDs, pressure sensitive adhesives, dicing tapes, electronic materials, insulating materials (including printed circuit boards, cable sheaths and the like), high-voltage insulating materials, interlayer insulating films, an insulating packings, insulating coating materials, adhesives, high-heat-resistance adhesives, optical adhesives, adhesives for LED elements, adhesives for various base materials, adhesives for heat sinks, paints, inks, coloring inks, coating materials (including hard coatings, sheets, films, optical disk coatings, optical fiber coatings and the like), molding materials (sheets, films, FRPs and the like), sealing materials, potting materials, encapsulating materials, encapsulating materials for light emitting diodes, reflectors and reflecting plates for light emitting diodes, photosemiconductor encapsulating materials, liquid crystal sealing agents, sealing agents for display devices, encapsulating materials for electrical materials, encapsulating materials for solar cells, high-heat-resistance sealing material, resist materials, colored resists, dry film resist materials, solder resist materials, materials for color filters, stereolithography, materials for electronic paper, materials for holograms, materials for solar cells, materials for fuel cells, display materials, recording materials, vibration-proof materials, waterproof materials, moisture-proof materials, heat-shrinkable rubber tubes, O-rings, photosensitive drums for copiers, solid electrolytes for batteries, and gas separation films. The multi-liquid curable resin composition or cured product can also be applied to concrete protective materials, linings, soil injection agents, cold storage materials, sealing material for sterilization treatment apparatuses, contact lenses, oxygen-enriched films, additives for resins, and the like.

In addition, a laminate containing the cured product of the present embodiment can be obtained by mixing the first liquid and the second liquid of the multi-liquid curable resin composition, applying the resulting mixture to a base material, and curing the mixture with a heat source to form a cured coating film. The laminate can be suitably used for front plates of personal computers, smartphones, tablets and the like, windowpanes of automobiles and the like, protective material for lamps of automobiles and the like, films and the like.

The base material is not particularly limited, and may be, for example, metal (e.g. aluminum, SUS, copper or iron), ceramics, glass, cement, a ceramic-based base material, a stone material, plastic (e.g. polycarbonate (PC), acrylic, ABS, PC-ABS alloy or polyethylene terephthalate (PET)), wood, paper, fiber or the like. The base material may be a film or a sheet. The multi-liquid curable resin composition of the present embodiment can be suitably used for coating automobiles, buildings, home appliances, industrial equipment and the like. The multi-liquid curable resin composition of the present embodiment is cured by heating, and is therefore suitable particularly for forming a coating film on a surface of a base material having a complicated shape. As described above, the multi-liquid curable resin composition can attain excellent scratch resistance even when cured at a relatively low temperature of 60° C. or higher and 120° C. or lower. Thus, even when the base material is an organic base material, damage to the base material due to heating during curing can be suppressed. Therefore, the multi-liquid curable resin composition can be suitably used even for an organic base material.

The thickness of the cured coating film formed from the multi-liquid curable resin composition of the present embodiment may be 1 μm or more and 100 μm or less. When the thickness of the cured coating film is 1 μm or more, the cured coating film has good scratch resistance and water resistance. When the thickness of the cured coating film is 100 μm or less, cracks resulting from shrinkage by curing hardly occur. The thickness may be 5 μm or more and 50 μm or less, or 10 μm or more and 40 μm or less.

EXAMPLES

Hereinafter, one or more embodiments of the present invention will be described in further detail by way of examples, but one or more embodiments of the present invention are not limited to these examples.

The substances used in Examples and Comparative Examples are as follows.

Alkoxysilane Compound
  Me (OFS-6070: methyltrimethoxysilane manufactured by Dow Toray Co., Ltd., molecular weight: 136.2)
  Ge (OFS-6040:3-glycidyloxypropyltrimethoxysilane manufactured by Dow Toray Co., Ltd., molecular weight: 236.3).
  EC (KBM-303:2-(3,4-epoxycyclohexyl)ethyltrimethoxysilane manufactured by Shin-Etsu Chemical Co., Ltd., molecular weight: 246.3)
  Ph (Z-6124: phenyltrimexilane manufactured by Dow Toray Co., Ltd., molecular weight: 198.3)

Condensation Catalyst
  DBP (dibutyl phosphate manufactured by Johoku Chemical Co., Ltd., molecular weight: 210.2): Acid catalyst
  $MgCl_2$ (magnesium chloride hexahydrate manufactured by Tokyo Chemical Industry Co., Ltd., molecular weight: 203.3): neutral salt (B)
  LiCl (lithium chloride manufactured by Tokyo Chemical Industry Co., Ltd., molecular weight: 42.4): neutral salt (B)
  TEA (triethylamine manufactured by Tokyo Chemical Industry Co., Ltd., molecular weight: 101.2): base catalyst β-dicarbonyl Compound (C)
  AcAc (acetylacetone manufactured by Tokyo Chemical Industry Co., Ltd., molecular weight: 100.1)
  Dimedone (5,5-dimethyl-1, 3-cyclohexanedione manufactured by Tokyo Chemical Industry Co., Ltd., molecular weight 140.2)
  Meldrum's acid (2,2-dimethyl-1,3-dioxane-4,6-dione manufactured by Tokyo Chemical Industry Co., Ltd., molecular weight: 144.1)

Organoaluminum Compound (E)
  ALCH (aluminum trisethyl acetoacetate manufactured by Kawaken Fine Chemicals Co., Ltd., molecular weight: 414.4)

Organotitanium Compound (E)
  TA-8 (titanium tetraisopropoxide from Matsumoto Fine Chemical Co., Ltd., molecular weight: 284.2)

Polyamine Compound
  DPTA (dipropylenetriamine manufactured by Tokyo Chemical Industry Co., Ltd., molecular weight: 131.2)

Solvent
  PMA (Propylene glycol methyl ether acetate manufactured by Tokyo Chemical Industry Co., Ltd., molecular weight: 132.2)

(Organopolysiloxane Reaction Time)

An alkoxysilane compound, a condensation catalyst and water were mixed at room temperature, the mixture was heated in an oil bath heated to 90° C. The mixture was reacted for 4 hours, where the time at which the internal temperature reached 70° C. was defined as a starting point, and the time duration during which thereafter the mixture was heated in an oil bath at 90° C. was defined as a reaction time.

(Removal of Alcohol in Synthesis of Organopolysiloxane)

The resin solution obtained by reacting the mixture for 4 hours as described above includes an organopolysiloxane, alcohol generated in the process of the reaction, and a slight amount of remaining water. To remove volatile components other than the organopolysiloxane by devolatilization under reduced pressure using an evaporator and an aspirator, devolatilization was performed at about 450 Torr while the resin solution was heated in an oil bath heated to 105° C., so that methanol and water in the amounts described in each table were removed to obtain an organopolysiloxane.

The amount of alcohol required to be removed by devolatilization was calculated in accordance with the following formula.

Amount of water added×32/18×2×85% (when the condensation catalyst is DBP or MgCl₂)

Amount of water added×32/18×2×100% (when the condensation catalyst is LiCl or TEA)

The weight of the total alcohol that can be generated was calculated on the assumption that 1 mole of alcohol is generated per 1 mole of alkoxysilyl groups in the organoalkoxysilane used in the reaction. For example, 1 mole of trimethoxysilyl groups include 3 moles of methoxysilyl groups, and generate 3 moles of methanol, and 1 mole of methyldimethoxysilyl groups include 2 moles of methoxysilyl groups, and generate 2 moles of methanol. In addition, 1 mole of water causes generation of 1 mole of silanol groups and 1 mole of alcohol from 1 mole of alkoxysilyl groups. Further, 1 mole of the silanol groups generated react with 1 mole of alkoxysilyl groups to generate 1 mole of alcohol. That is, 2 moles of alcohol are generated from 1 mole of water. The degree of procession of this reaction varies depending on a condensation catalyst, and with DBP, the degree of procession is only about 85%. Therefore, in view of this point, correction was made on the calculation expression as described above.

(Synthesis Example 1) Synthesis of organopolysiloxane 2.0 g of Me, 104.5 g of Ge, 34.7 g of EC, 0.020 g of MgCl₂ and 19.4 g of pure water (60 mol % with respect to the alkoxysilyl group) were added into a 300 ml four-necked flask, heated in an oil bath set at 90° C., and reacted for 4 hours. Thereafter, devolatilization under reduced pressure was performed using an evaporator and an oil bath set at 105° C., so that a total of 52.0 g of generated methanol and residual water were removed to obtain about 108.6 g of an organopolysiloxane. The SC (solid content) of the obtained organopolysiloxane was measured, and the result showed that the solid content was 92%. The weight average molecular weight was 3200, and the result of $^{29}$Si-NMR measurement showed that the ratio of T1, T2 and T3 was 4:25:71 and the ratio of T3: [T3/(Q1+Q2+Q3+Q4+T1+T2+T3+D1+D2+M1)]×100 was 71%. The condensation ratio was 89%. The SC is a weight ratio of a component, which was not volatilized when the obtained organopolysiloxane was heated to 105° C., to the organopolysiloxane.

An organopolysiloxane solution prepared by adding 3 g of AcAc as the β-dicarbonyl compound (C) to the obtained organopolysiloxane and further adding PMA as the solvent (D) to adjust the SC to 70.0% was used for preparation of a clear coating solution.

Synthesis Examples 2 to 19

Except that the types and use amounts of the raw materials and the removal amount of methanol and water was changed as shown in Tables 1 and 2, the same procedure as in Synthesis Example 1 was carried out to obtain organopolysiloxanes. Tables 1 and 2 show the SC, the weight average molecular weights, the ratios of T1, T2 or T3 and the condensation ratios of the obtained organopolysiloxanes. As shown in Tables 1 and 2, the β-dicarbonyl compound (C) was added or was not added to the obtained organopolysiloxanes, and further, PMA was added as the solvent (D) to adjust the SC to 70.0%. The thus-obtained organopolysiloxane solutions were used for preparation of a clear coating solution.

| | | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 | Synthesis Example 10 |
|---|---|---|---|---|---|---|---|---|---|---|---|
| Alkoxysilane compound (unit: g) | Me | 2.0 | 0.0 | 0.0 | 0.0 | 0.0 | 0.0 | 0.0 | 0.0 | 0.0 | 20.3 |
| | Ge | 104.5 | 105.9 | 105.9 | 105.9 | 105.9 | 105.9 | 105.9 | 141.2 | 141.2 | 127.1 |
| | EC | 34.7 | 34.7 | 34.7 | 34.7 | 34.7 | 34.7 | 34.7 | 0.0 | 0.0 | 0.0 |
| | Ph | 0.0 | 0.0 | 0.0 | 0.0 | 0.0 | 0.0 | 0.0 | 0.0 | 0.0 | 0.0 |
| Condensation catalyst (unit: g) | DBP | | | | | | | | | | |
| | MgCl₂: Neutral salt (B) | 0.020 | 0.020 | 0.020 | 0.020 | 0.020 | 0.020 | | 0.020 | 0.020 | 0.020 |
| | LiCl: Neutral salt (B) | | | | | | | 0.020 | | | |
| | TEA | | | | | | | | | | |
| Water | g | 19.4 | 15.9 | 19.1 | 19.1 | 15.9 | 15.9 | 14.3 | 19.4 | 32.3 | 22.3 |
| | Mol % with respect to SiOR | 60% | 50% | 60% | 60% | 50% | 50% | 45% | 60% | 100% | 60% |
| Removal amount of methanol and water | g | −52.0 | −48.1 | −51.3 | −51.3 | −48.1 | −48.1 | −50.9 | −52.0 | −64.9 | −59.7 |
| Measured SC | | 92% | 93% | 94% | 94% | 93% | 93% | 92% | 91% | 94% | 92% |
| Weight average molecular weight | Mw | 3200 | 3100 | 3400 | 3400 | 3100 | 3100 | 8800 | 3500 | 4200 | 4400 |
| β-dicarbonyl compound (C) (unit: g) | AcAc | 3 | 3 | 3 | 6 | | | 3 | 3 | 3 | 3 |
| | Dimedone | | | | | 1 | | | | | |
| | Meldrum's acid | | | | | | 1 | | | | |
| Solvent (D): PMA | g | 31.1 | 32.7 | 34.2 | 31.2 | 34.7 | 34.7 | 29.7 | 29.6 | 34.2 | 31.5 |

-continued

|  |  | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 | Synthesis Example 10 |
|---|---|---|---|---|---|---|---|---|---|---|---|
| $^{29}$Si-NMR | T1 | 4% | 10% | 5% | 5% | 10% | 10% | 4% | 9% | 4% | 8% |
|  | T2 | 25% | 28% | 25% | 25% | 28% | 28% | 23% | 29% | 26% | 29% |
|  | T3 | 71% | 62% | 70% | 70% | 62% | 62% | 73% | 62% | 70% | 63% |
| Condensation ratio | % | 89% | 84% | 88% | 88% | 84% | 84% | 90% | 84% | 89% | 85% |

|  |  | Synthesis Example 11 | Synthesis Example 12 | Synthesis Example 13 (comparative) | Synthesis Example 14 (comparative) | Synthesis Example 15 (comparative) | Synthesis Example 16 (comparative) | Synthesis Example 17 (comparative) | Synthesis Example 18 (comparative) | Synthesis Example 19 (comparative) |
|---|---|---|---|---|---|---|---|---|---|---|
| Alkoxysilane compound (unit: g) | Me | 0.0 | 0.0 | 0.0 | 0.0 | 0.0 | 0.0 | 0.0 | 0.0 | 0.0 |
|  | Ge | 113.0 | 70.6 | 105.9 | 105.9 | 105.9 | 141.2 | 141.2 | 0.0 | 0.0 |
|  | EC | 0.0 | 69.5 | 34.7 | 34.7 | 34.7 | 0.0 | 0.0 | 138.9 | 138.9 |
|  | Ph | 30.7 | 0.0 | 0.0 | 0.0 | 0.0 | 0.0 | 0.0 | 0.0 | 0.0 |
| Condensation catalyst (unit: g) | DBP |  |  |  |  |  |  | 0.020 | 0.020 |  |
|  | MgCl$_2$: Neutral salt (B) | 0.020 | 0.020 |  |  | 0.020 |  |  |  | 0.020 |
|  | LiCl: Neutral salt (B) |  |  |  |  |  |  |  |  |  |
|  | TEA |  |  | 0.020 | 0.020 |  | 0.020 |  |  |  |
| Water | g | 20.5 | 18.8 | 15.9 | 15.9 | 15.9 | 16.1 | 19.4 | 18.3 | 18.3 |
|  | Mol % with respect to SiOR | 60% | 60% | 50% | 50% | 50% | 50% | 60% | 60% | 60% |
| Removal amount of methanol and water | g | −55.1 | −50.5 | −56.6 | −56.6 | −48.1 | −57.4 | −52.0 | −49.1 | −49.1 |
| Measured SC |  | 92% | 94% | 93% | 93% | 93% | 93% | 82% | 93% | 93% |
| Weight average molecular weight | Mw | 2700 | 3600 | 7800 | 7800 | 3100 | 5300 | 2600 | 3000 | 4000 |
| β-dicarbonyl compound (C) (unit: g) | AcAc | 3 | 3 |  | 3 |  |  |  | 3 | 3 |
|  | Dimedone |  |  |  |  |  |  |  |  |  |
|  | Meldrum's acid |  |  |  |  |  |  |  |  |  |
| Solvent (D): PMA | g | 31.3 | 34.2 | 32.9 | 29.9 | 35.7 | 32.9 | 18.6 | 32.5 | 32.5 |
| $^{29}$Si-NMR | T1 | 5% | 5% | 0% | 0% | 10% | 0% | 28% | 5% | 2% |
|  | T2 | 26% | 26% | 22% | 22% | 28% | 20% | 34% | 25% | 27% |
|  | T3 | 69% | 69% | 78% | 78% | 62% | 80% | 38% | 70% | 71% |
| Condensation ratio | % | 88% | 88% | 93% | 93% | 84% | 93% | 70% | 88% | 90% |

(Weight Average Molecular Weight)

The weight average molecular weight of the organopolysiloxane was measured by GPC. GPC was performed using HLC-8320 GPC manufactured by Tosoh Corporation as a liquid feeding system, TSK-GEL H Type manufactured by Tosoh Corporation as a column, and THF as a solvent, and the weight average molecular weight was calculated in terms of polystyrene.

($^{29}$Si-NMR)

The constituent units derived from the monoorganotrialkoxysilane are classified into a constituent unit T0 which does not form a siloxane bond, a constituent unit T1 forming one siloxane bond, a constituent unit T2 forming two siloxane bonds, and a constituent unit T3 forming three siloxane bonds. Using AVANCEIIIHD 500 manufactured by BRUKER, $^{29}$Si-NMR of the organopolysiloxane was measured with deuterated chloroform as a solvent, and the ratio of each peak area to the total of peak areas derived from T1, T2 and T3 structures was defined as the ratio of T1, T2 or T3 contained in the organopolysiloxane. In each synthesis example, Q1 to 4, D1 to D2 and M1 structures are not included, and the ratio thereof is 0.

(Condensation Ratio)

The value calculated from the formula: (1×X+2×Y+3×Z)/3 was defined as a condensation rate (siloxane bond formation ratio), where the ratio (%) of T1, T2 and T3 are X, Y and Z, respectively.

(Preparation of Clear Coating Solution)

In accordance with the formulation shown in Tables 3 to 5, the organopolysiloxane solutions obtained in Synthesis Examples 1 to 19, ALCH which is the organoaluminum compound (E) or TA-8 which is the organotitanium compound (E), and PMA as a dilution solvent were mixed to prepare clear coating solutions.

(Preparation of Cured Coating Film)

The prepared clear coating solution was applied onto an ABS plate of 50×150×2 mm with a No. 40 bar coater, and placed in a hot air dryer set at 80° C. for 30 minutes, so that the solvent was removed and the coating film was cured to obtain a cured coating film with a thickness of about 0.030 mm in a dry state. The obtained cured coating film was evaluated for adhesion, scratch resistance and water resistance. Specific description is shown below.

Example 1

28.6 g of the organopolysiloxane solution obtained in Synthesis Example 1, 1.0 g of ALCH and 12.4 g of PMA were mixed to obtain a clear coating solution. The obtained clear coating solution was applied onto an ABS plate of 50×150×2 mm with a No. 40 bar coater, and placed in a hot air dryer set at 80° C. for 30 minutes, so that the solvent was removed and the coating film was cured to obtain a cured coating film laminate.

Examples 2 to 13, Comparative Examples 1 to 7 and Reference Examples 1 to 2

Except that the formulation was changed to the formulations shown in Tables 3 to 5, the same procedure as in Example 1 was carried out to obtain a clear coating solution and a cured coating film laminate.

(Adhesion)

A cut was made on the cured coating film with a cutter so as to form 100 squares of 10×10 crosscuts at intervals of 1 mm, a cellophane tape (registered trademark) manufactured by Nichiban Co., Ltd. was attached onto the cut, the cured coating film was vigorously peeled off by 90° in an upward direction, and whether or not the cured coating film was peeled off from the base material was visually observed. Score-based evaluation was performed on a one point per square basis, where a score of 100 was given when the cured coating film perfectly adhered, and a score of 0 was given when the cured coating film was completely peeled off. Tables 3 to 5 show the results.

C: A score of less than 100 is given in the adhesion test conducted on a cured coating film laminate immediately after curing.

B: A score of 100 is given in the adhesion test conducted on a cured coating film laminate immediately after curing, but a score of less than 100 is given in the adhesion test conducted with a cured coating film laminate immersed in hot water at 60° C. for 24 hours, taken out and immediately wiped lightly to remove water.

A: A score of 100 is given in the adhesion test conducted with a cured coating film laminate immersed in hot water at 60° C. for 24 hours, taken out and immediately wiped lightly to remove water.

(Scratch Resistance)

Using an eraser abrasion tester [manufactured by Mitsumoto Seisakujo K.K.], steel wool #0000 was placed under a load of 500 g/cm$^2$, and made to reciprocate on the surface of the cured coating film with a stroke length of 10 cm. The reciprocation number at which the coating film was scratched was measured by visual evaluation. Tables 3 to 5 show the results.

D: There is a scratch after 10 reciprocations.

C: There is no scratch after 10 reciprocations, and there is a scratch after 50 reciprocations. B: There is no scratch after 50 reciprocations, and there is a scratch after 100 reciprocations. A: There is no scratch after 100 reciprocations.

(Water Resistance)

The cured coating film laminate was immersed in hot water at 60° C. for 24 hours, taken out, then wiped to remove water droplets on the surfaces of the laminate, and dried at room temperature for 2 hours, followed by examining a change in appearance of the cured coating film by visual observation. Tables 3 to 5 show the results.

C: There is a change in smoothness such as peeling and creases.

B: There is no change in smoothness, and there is a change in color tone such as whitening.

A: There is no change in appearance.

TABLE 3

| | | | Example | | | | | | |
|---|---|---|---|---|---|---|---|---|---|
| | | SC | 1 | 2 | 3 | 4 | 5 | 6 | 7 |
| Organopoly-siloxane solution (unit: g) | Synthesis Example 1 | 70% | 28.6 | | | | | | 28.6 |
| | Synthesis Example 2 | 70% | | 28.6 | | | | | |
| | Synthesis Example 3 | 70% | | | 28.6 | | | | |
| | Synthesis Example 4 | 70% | | | | 28.6 | | | |
| | Synthesis Example 5 | 70% | | | | | 28.6 | | |
| | Synthesis Example 6 | 70% | | | | | | 28.6 | |
| Organo-aluminum compound (E) (unit: g) | ALCH | 100% | 1.0 | 1.0 | 1.0 | 1.0 | 1.0 | 1.0 | |
| Organotitanium compound (E) (unit: g) | TA-8 | 100% | | | | | | | 1.0 |
| Dilution solvent (unit: g) | PMA | | 12.4 | 12.4 | 12.4 | 12.4 | 12.4 | 12.4 | 12.4 |
| Adhesion | | | A | A | A | A | A | A | A |
| Scratch resistance | | | A | A | A | A | A | A | A |
| Water resistance | | | A | A | A | A | A | A | A |

TABLE 4

|  |  | SC | Example 8 | Example 9 | Example 10 | Example 11 | Example 12 | Example 13 |
|---|---|---|---|---|---|---|---|---|
| Organo poly-siloxane solution (unit: g) | Synthesis Example 7 | 70% | 28.6 |  |  |  |  |  |
|  | Synthesis Example 8 | 70% |  | 28.6 |  |  |  |  |
|  | Synthesis Example 9 | 70% |  |  | 28.6 |  |  |  |
|  | Synthesis Example 10 | 70% |  |  |  | 28.6 |  |  |
|  | Synthesis Example 11 | 70% |  |  |  |  | 28.6 |  |
|  | Synthesis Example 12 | 70% |  |  |  |  |  | 28.6 |
| Organo-aluminum compound (E) (unit: g) | ALCH | 100% | 1.0 | 1.0 | 1.0 | 1.0 | 1.0 | 1.0 |
| Dilution solvent (unit: g) | PMA |  | 12.4 | 12.4 | 12.4 | 12.4 | 12.4 | 12.4 |
|  | Adhesion |  | A | B | B | B | A | A |
|  | Scratch resistance |  | A | A | B | A | A | A |
|  | Water resistance |  | A | B | B | B | A | A |

TABLE 5

|  |  | SC | Comparative Example 1 | 2 | 3 | 4 | 5 | 6 | 7 | Reference Example 1 | 2 |
|---|---|---|---|---|---|---|---|---|---|---|---|
| Organopoly-siloxane solution (unit: g) | Synthesis Example 1 | 70% |  |  |  |  |  |  |  | 28.6 | 28.6 |
|  | Synthesis Example 13 | 70% | 28.6 |  |  |  |  |  |  |  |  |
|  | Synthesis Example 14 | 70% |  | 28.6 |  |  |  |  |  |  |  |
|  | Synthesis Example 15 | 70% |  |  | 28.6 |  |  |  |  |  |  |
|  | Synthesis Example 16 | 70% |  |  |  | 28.6 |  |  |  |  |  |
|  | Synthesis Example 17 | 70% |  |  |  |  | 28.6 |  |  |  |  |
|  | Synthesis Example 18 | 70% |  |  |  |  |  | 28.6 |  |  |  |
|  | Synthesis Example 19 | 70% |  |  |  |  |  |  | 28.6 |  |  |
| Organo-aluminum compound (E) (unit: g) | ALCH | 100% | 1.0 | 1.0 | 1.0 | 1.0 | 1.0 | 1.0 | 1.0 |  |  |
| Polyamine compound (unit: g) | DPTA | 100% |  |  |  |  |  |  |  |  | 1.0 |
| Dilution solvent (unit: g) | PMA |  | 12.4 | 12.4 | 12.4 | 12.4 | 12.4 | 12.4 | 12.4 | 11.4 | 12.4 |
|  | Adhesion |  | A | A | A | B | C | A | A | C | C |
|  | Scratch resistance |  | D | D | D | D | A | C | C | D | C |
|  | Water resistance |  | A | A | A | B | B | A | A | C | B |

Tables 3 and 4 reveals that in each of Examples 1 to 13, an organopolysiloxane solution obtained by blending the β-dicarbonyl compound (C) and the solvent (D) with the organopolysiloxane (A) having a glycidyloxy group and produced using the neutral salt (B) was cured in the presence of an organoaluminum compound or organotitanium compound (E), and the thus-obtained cured coating film was good in all of adhesion to a base material, scratch resistance, and water resistance.

Table 5 reveals that in each of Comparative Examples 1, 2 and 4, an organopolysiloxane produced using TEA which is not the neutral salt (B) but a base catalyst, and as a result, the scratch resistance of the cured coating film was not sufficient regardless of whether the β-dicarbonyl compound (C) was present or not. In Comparative Example 3, an organopolysiloxane solution in which the β-dicarbonyl compound (C) was not blended with the organopolysiloxane (A) produced using the neutral salt (B) was used, and the scratch resistance of the cured coating film was not sufficient. In Comparative Example 5, an organopolysiloxane solution in which the β-dicarbonyl compound (C) was not blended with an organopolysiloxane produced using DBP which is not the neutral salt (B) but an acid catalyst was used, and good scratch resistance was attained, but adhesion to the base material was not sufficient. In Comparative Example 6, an organopolysiloxane produced using DBP, which is not the neutral salt (B) but an acid catalyst, and having no glycidyloxy group and having an epoxycyclohexyl group, and the scratch resistance was not sufficient. In Comparative Example 7, an organopolysiloxane produced using the neutral salt (B) and having no glycidyloxy group and having an epoxycyclohexyl group, and the scratch resistance was not sufficient.

In Reference Example 1, curing was performed without blending the organoaluminum compound or organotitanium compound (E), and any of adhesion to a base material, scratch resistance and water resistance was not sufficient. In Reference Example 2, curing was performed in the presence of a polyamine compound as an amine-based curing agent instead of the organoaluminum compound or organotitanium compound (E), and adhesion to a base material and scratch resistance were not sufficient. The above results show that for obtaining a cured product having good adhesion to the base material, scratch resistance and water resistance by curing the resin composition containing the organopolysiloxane (A), it is preferable to cure the resin composition in the presence of the organoaluminum compound or organotitanium compound (E).

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A multi-liquid curable resin composition comprising:
   a first liquid; and
   a second liquid,
   the first liquid being a resin composition comprising:
   (A) a glycidyloxy group-containing organopolysiloxane in an amount of 100 parts by weight;
   (B) a neutral salt in an amount of 0.01 parts by weight or more and 0.1 parts by weight or less;
   (C) a β-dicarbonyl compound in an amount of 0.5 parts by weight or more and 10 parts by weight or less; and
   (D) a solvent in an amount of 20 parts by weight or more and 300 parts by weight or less,
   the second liquid containing (E) an organoaluminum compound and/or organotitanium compound,
   wherein the glycidyloxy group-containing organopolysiloxane (A) satisfies a requirement that $[T3/(Q1+Q2+Q3+Q4+T1+T2+T3+D1+D2+M1)] \times 100$ is 50% or more and 75% or less,
      where among constituent units forming the glycidyloxy group-containing organopolysiloxane (A):
      constituent units derived from a tetraalkoxysilane, which form one, two, three and four siloxane bonds, are defined as Q1, Q2, Q3 and Q4, respectively;
      constituent units derived from a monoorganotrialkoxysilane, which form one, two and three siloxane bonds, are defined as T1, T2 and T3, respectively;
      constituent units derived from a diorganodialkoxysilane, which form one and two siloxane bonds, are defined as D1 and D2, respectively; and
      constituent unit derived from a triorganomonoalkoxysilane, which form one siloxane bond, is defined as M1, and
   wherein the neutral salt (B) comprises a cation selected from the group consisting of group I element ions, and group II element ions, and an anion selected from the group consisting of group XVII element ions except for fluoride ion.

2. A cured product obtained by mixing a resin composition with an (E) organoaluminum compound and/or organotitanium compound to obtain a mixture, and curing the mixture, wherein the resin composition comprises:
   (A) a glycidyloxy group-containing organopolysiloxane in an amount of 100 parts by weight;
   (B) a neutral salt in an amount of 0.01 parts by weight or more and 0.1 parts by weight or less;
   (C) a β-dicarbonyl compound in an amount of 0.5 parts by weight or more and 10 parts by weight or less; and
   (D) a solvent in an amount of 20 parts by weight or more and 300 parts by weight or less,
   wherein the glycidyloxy group-containing organopolysiloxane (A) satisfies a requirement that $[T3/(Q1+Q2+Q3+Q4+T1+T2+T3+D1+D2+M1)] \times 100$ is 50% or more and 75% or less,
      where among constituent units forming the glycidyloxy group-containing organopolysiloxane (A):
      constituent units derived from a tetraalkoxysilane, which form one, two, three and four siloxane bonds, are defined as Q1, Q2, Q3 and Q4, respectively;
      constituent units derived from a monoorganotrialkoxysilane, which form one, two and three siloxane bonds, are defined as T1, T2 and T3, respectively;
      constituent units derived from a diorganodialkoxysilane, which form one and two siloxane bonds, are defined as D1 and D2, respectively; and
      constituent unit derived from a triorganomonoalkoxysilane, which form one siloxane bond, is defined as M1, and
   wherein the neutral salt (B) comprises a cation selected from the group consisting of group I element ions, and group II element ions, and an anion selected from the group consisting of group XVII element ions except for fluoride ion.

3. A method for producing a laminate containing a base material and a cured coating film, the method comprising the steps of:
   mixing a resin composition with an (E) organoaluminum compound and/or organotitanium compound to obtain a mixture; and
   applying the mixture to the base material, and heating and curing the mixture to form the cured coating film,
   wherein the resin composition comprises:
   (A) a glycidyloxy group-containing organopolysiloxane in an amount of 100 parts by weight;
   (B) a neutral salt in an amount of 0.01 parts by weight or more and 0.1 parts by weight or less;
   (C) a β-dicarbonyl compound in an amount of 0.5 parts by weight or more and 10 parts by weight or less; and
   (D) a solvent in an amount of 20 parts by weight or more and 300 parts by weight or less,
   wherein the glycidyloxy group-containing organopolysiloxane (A) satisfies a requirement that $[T3/(Q1+Q2+Q3+Q4+T1+T2+T3+D1+D2+M1)] \times 100$ is 50% or more and 75% or less,
      where among constituent units forming the glycidyloxy group-containing organopolysiloxane (A):

constituent units derived from a tetraalkoxysilane, which form one, two, three and four siloxane bonds, are defined as Q1, Q2, Q3 and Q4, respectively;

constituent units derived from a monoorganotrialkoxysilane, which form one, two and three siloxane bonds, are defined as T1, T2 and T3, respectively;

constituent units derived from a diorganodialkoxysilane, which form one and two siloxane bonds, are defined as D1 and D2, respectively; and constituent unit derived from a triorganomonoalkoxysilane, which form one siloxane bond, is defined as M1, and wherein the neutral salt (B) comprises a cation selected from the group consisting of group I element ions, and group II element ions, and an anion selected from the group consisting of group XVII element ions except for fluoride ion.

4. The multi-liquid curable resin composition according to claim 1, wherein the neutral salt (B) is at least one selected from the group consisting of magnesium chloride, magnesium bromide, and magnesium iodide.

5. The multi-liquid curable resin composition according to claim 1, wherein the neutral salt (B) is a condensation catalyst in production of the glycidyloxy group-containing organopolysiloxane (A).

6. The multi-liquid curable resin composition according to claim 1, wherein the glycidyloxy group-containing organopolysiloxane (A) further has an epoxycyclohexyl group.

7. The multi-liquid curable resin composition according to claim 1, wherein the first liquid does not contain either an acidic compound having a molecular weight of 1000 or less or a basic compound having a molecular weight of 1000 or less.

8. The multi-liquid curable resin composition according to claim 1, wherein the glycidyloxy group-containing organopolysiloxane (A) is obtained by subjecting an alkoxysilane component containing an alkoxysilane compound having a glycidyloxy group to a hydrolysis and dehydration condensation reaction in presence of the neutral salt (B) and water.

9. The multi-liquid curable resin composition according to claim 8, wherein a ratio of the alkoxysilane compound having a glycidyloxy group to a total of the alkoxysilane component is 50 mol % or more and 100 mol % or less.

10. The multi-liquid curable resin composition according to claim 8, wherein a monoorganotrialkoxysilane constitutes 70 mol % or more and 100 mol % or less of a total of the alkoxysilane component.

11. The multi-liquid curable resin composition according to claim 8, wherein an amount of water added is 30 mol % or more and 80 mol % or less based on a total number of moles of alkoxy groups contained in the alkoxysilane component and directly bonded to silicon atoms.

12. The multi-liquid curable resin composition according to claim 1, wherein the β-dicarbonyl compound (C) improves scratch resistance of a cured product obtained by curing the multi-liquid curable resin composition.

13. The multi-liquid curable resin composition according to claim 1, wherein the β-dicarbonyl compound (C) is at least one selected from the group consisting of acetylacetone, methyl acetoacetate and ethyl acetoacetate.

14. The multi-liquid curable resin composition according to claim 1, wherein an amount of the β-dicarbonyl compound (C) is 0.7 parts by weight or more and 4 parts by weight or less.

15. The multi-liquid curable resin composition according to claim 1, wherein an amount of the β-dicarbonyl compound (C) is 1 part by weight or more and 3 parts by weight or less.

16. The multi-liquid curable resin composition according to claim 1, wherein the organoaluminum compound and/or organotitanium compound (E) reacts with a reactive silicon group of the glycidyloxy group-containing organopolysiloxane (A) to form a Si—O—Al bond or a Si—O—Ti bond.

17. The multi-liquid curable resin composition according to claim 1, wherein the organoaluminum compound and/or organotitanium compound (E) is at least one selected from the group consisting of aluminum alkoxide compounds, aluminum acetoacetate compounds, aluminum ethylacetoacetate compounds, aluminum acetylacetonate compounds, titanium alkoxide compounds, titanium acetoacetate compounds, titanium ethyl acetoacetate compounds and titanium acetylacetonate compounds.

18. The multi-liquid curable resin composition according to claim 1, wherein an amount of the organoaluminum compound and/or organotitanium compound (E) is 0.5 parts by weight or more and 10 parts by weight or less.

19. The multi-liquid curable resin composition according to claim 1, wherein [(T1+T2)/(Q1+Q2+Q3+Q4+T1+T2+T3+D1+D2+M1)]×100 is 25% or more and 50% or less.

20. The multi-liquid curable resin composition according to claim 1, wherein [T1/(Q1+Q2+Q3+Q4+T1+T2+T3+D1+D2+M1)]×100 is 2% or more and 20% or less.

* * * * *